United States Patent

[11] 3,585,848

| [72] | Inventor | Adrianus Korpel<br>Prospect Heights, Ill. |
| --- | --- | --- |
| [21] | Appl. No. | 763,676 |
| [22] | Filed | Sept. 30, 1968 |
| [45] | Patented | June 22, 1971 |
| [73] | Assignee | Zenith Radio Corporation<br>Chicago, Ill. |

[54] METHOD AND APPARATUS FOR RECORDING ACOUSTIC IMAGES AND HOLOGRAMS
5 Claims, 1 Drawing Fig.

[52] U.S. Cl. ..................................... 73/67.5,
340/5, 350/3.5
[51] Int. Cl. ........................................ G01n 29/04
[50] Field of Search ............................ 73/67.5 H;
340/5 H; 350/3.5

[56] References Cited
FOREIGN PATENTS
1,479,712  3/1967  France

OTHER REFERENCES
Massey, G. A., " An Optical Heterodyne Ultrasonic Image Converter" PROC. OF IEEE, Vol. 56, Dec., 1958 (Author's Manuscript Re' d. July 8, 1968, Revised Sept. 9, 1968) p. 2157—2161

*Primary Examiner*—Richard C. Queisser
*Assistant Examiner*—Arthur E. Korkosz
*Attorney*—John J. Pederson

ABSTRACT: The object or specimen is irradiated with acoustic waves to develop a field of acoustic vibrations in a reflective surface, and a flying spot laser scanner is provided to scan the surface with a collimated light beam. Variations in a reflection component of the light from the surface are measured to develop an output signal having frequency variations which correspond with acoustic intensity variations in the plane of the object surface. The output signal is heterodyned with a reference signal of a frequency bearing a predetermined relationship to that of the irradiating acoustic waves, and the resulting intermodulation product is converted to a visual-type display to generate an acoustic hologram of the object. A conventional nonholographic acoustic image is obtained by amplitude detecting the output signal without reference signal mixing.

PATENTED JUN22 1971 3,585,848
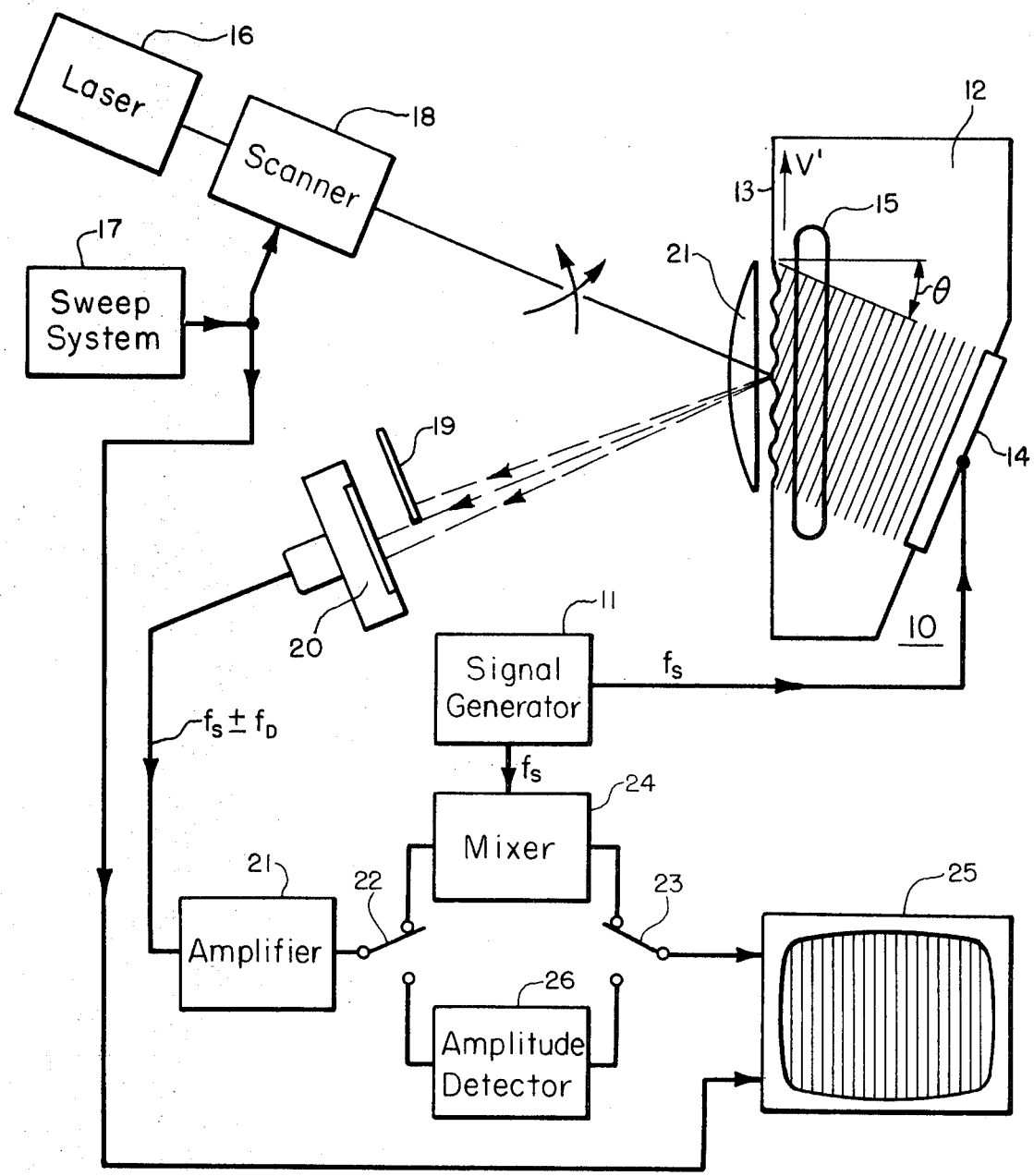
Inventor
Adrianus Korpel
By John J. Pederson
Attorney

METHOD AND APPARATUS FOR RECORDING ACOUSTIC IMAGES AND HOLOGRAMS

BACKGROUND OF THE INVENTION

This invention relates to acoustic imaging and holography and more particularly to a new and improved method and apparatus of recording acoustic holograms.

The ability to "see" with sound has always been attractive to workers in such widely varying fields as for example geology, oceanography, structural engineering and medicine. Thus the geophysicist observes pulses of sound generated by explosive charges or even by earthquakes. These pulses travel along and through the earth's crust and, by their relative time of arrival, convey information about its composition and structure. The oceanographer sends sonar pulses down to the sea bottom in a continuous stream and by processing their echo returns constructs maps and profiles in much the same way as the radar engineer. The same technique may be used by the physician to map a patient's interior and perhaps to see structures missed by X-rays, and again by the structural engineer to locate voids and cracks in materials.

In addition to the sonar or pulse-echo methods, there exists a variety of techniques in which a sound image is obtained in a way more analogous to optics. This analogy has in recent years been extended to include holographic techniques and has led to the inception of a new discipline—acoustic holography—in which the principles and techniques of acoustic imaging are merged with those of optical holography.

Holography may be described as a method for recording and reconstructing the amplitude and phase distribution of a propagating field in a given plane. Imaging, on the other hand, refers to a method or system which concerns itself only with the amplitude, or rather the power which is proportional to the square of the amplitude. The preservation of phase in holography is of crucial importance in the sense that, upon reconstruction, the field is automatically reproduced faithfully everywhere in space and not only in the plane of the recorder. Thus, in the field of optics, holography has become identified with three-dimensional reconstruction; no such dramatic result or effect is achieved with acoustic holography because acoustic holograms are recorded at the wavelength of sound but are then reconstructed at the wavelength of visible light. Because of this scaling down in wavelength, a faithful three-dimensional reconstruction of the sound field in visible light is only possible if all three dimensions are scaled by a factor corresponding to the ratio between the light and sound wavelengths. For the usual range of sound frequencies, of the order of 1 to 10 megahertz, a demagnification factor of from several hundred to several thousand is involved. For convenience, the field is usually reconstructed in such a way that there is no net change of length or width in the two lateral dimensions, and this introduces a longitudinal excess magnification by a factor corresponding to the ratio between the sound and light wavelengths. The effect is similar to the exaggerated depth of field encountered when using binoculars or taking pictures with a telephoto lens.

Conventional acoustic imaging devices and systems can be combined with acoustic lenses to examine and inspect acoustic fields in selected image planes, as for use in biomedical diagnostic apparatus and systems. However, such acoustic lenses are generally of much lower quality than their optical analogs, and they must of necessity be situated inside the medium through which the sound waves propagate which makes focusing difficult even in a liquid sound medium.

Accordingly, it is a principal object of the present invention to provide a new and improved method of recording acoustic holograms.

It is a further object of the invention to provide a new and improved apparatus for recording acoustic holograms.

Yet another object of the invention is to provide a new and improved acoustic imaging device which is useful in translating acoustic images to surface wave patterns.

In accordance with the present invention, a new and improved method of recording an acoustic hologram of an object comprises the steps of irradiating the object with acoustic waves of a predetermined frequency to develop a field of acoustic vibrations in a predetermined surface plane, and scanning the surface plane with a collimated light beam. Variations in a reflection component of light from the surface plane are measured to develop an output signal having frequency variations which correspond with acoustic intensity variations in the surface plane. The output signal is heterodyned with an electrical signal having a frequency bearing a predetermined relationship to the predetermined frequency of the acoustic waves to develop an image signal, and the image signal is converted to a visual display to generate an acoustic hologram of the object.

In optical holography, an image field is made to interfere with a so-called reference beam and the resulting interference pattern is recorded on photographic, thermoplastic or photochromic film. This pattern consists of a system of fine fringes varying both in contrast and fringe spacing. The contrast at any particular point is a measure of the amplitude of the image field at that point, whereas the positions of the fringes relate to the phase, with their spacing beam determined by the slope of the image field wave front relative to that of the reference beam. Thus, although the recording medium is basically responsive only to light power, it is nevertheless possible to record both light amplitude and light phase by using a reference beam. There is a direct analogy to communication engineering if the fringes are compared with the waves of a radio frequency carrier which is modulated both in phase (fringe position) and amplitude (fringe contrast). Reconstruction of the image field is accomplished by illuminating the recorded interference pattern with the original reference beam. Strictly speaking, this generates two related fields (conjugate images), which propagate in different directions and may be separated by spatial filters, a process analogous to the separation of sidebands by electrical filters.

Analogous systems have been used in acoustic holography. A conventional image conversion device is employed and a acoustic reference beam is added to the sound field. A pattern of fringes appears on the image conversion device. The fringe pattern is photographed and the developed negative is illuminated with a laser beam. Depending on the scale of the hologram, various cross sections of sound field may be inspected by various known methods. In the surface relief method, a cross section of a sound field is imaged onto the surface of a liquid by means of an acoustic lens. The image exists in the form of a stationary pattern of surface perturbations caused by the radiation pressure of the sound, with gravity and surface tension acting as restoring forces. This pattern may be visualized and photographed by transmission or reflection Schlieren techniques. In such techniques, objects are photographed by only making use of the light which is scattered over large angles while discarding light scattered over a narrow angle, or vice versa. Scattering centers such as surface perturbations then show up very clearly. The only acoustic lenses required are condenser lenses, not imaging lenses. Various technical refinements may be added to eliminate the twin image and reduce scatter due to irregularities in film thickness.

To obtain greater sensitivity than that provided by using the surface relief method of acoustic imaging, a fast sampling system using a modified image orthicon television camera tube has been employed. The image orthicon is provided with a piezoelectric rather than a photoemissive target. The object is immersed in a tank of water and irradiated with acoustic waves which, after traversing the object, are projected onto the piezoelectric surface of the tube at the other end of the tank. The sound field incident on the tube induces charges on the piezoelectric surface which are read off by a scanning electron beam. The resulting electrical signal is fed to a monitor which then displays a picture of the incident sound field. If a sound reference beam is also impressed on the liquid, an acoustic hologram results. While a system of this type affords substantially greater sensitivity than use of the surface relief method, the required equipment is undesirably complex, and the quality and contrast of the resulting acoustic image are undesirably limited.

The features of the present invention which are believed to be novel are set forth with particularity in the appended claims. The invention, together with further objects and advantages thereof, may best be understood by reference to the following description taken in connection with the accompanying drawing, in which the single FIGURE is a schematic block diagram of a preferred embodiment of the invention.

The method and apparatus of the present invention differ from the prior art approaches by translating the acoustic field of the irradiated object to surface wave perturbations on a solid surface which is then scanned with a flying spot laser scanner. In the apparatus shown in the drawings, a transducer 10 of special construction generates acoustic waves at a frequency $f_s$ determined by that of an applied electrical signal from a signal generator 11. While the acoustic wave frequency is not critical, suitable results for many applications may be obtained by employing an acoustic signal frequency in the range from 1 to 10 megahertz.

Transducer 10 comprises a block of suitable solid material, such as methyl methacrylate (such as "Lucite" supplied by E. I. DuPont de Nemours, Inc.), polystyrene or other plastic material provided with a surface 13 which is rendered highly reflective by the provision of a surface film of polished gold or the like. Acoustically coupled to block 12 is a piezoelectric transducer 14 which is responsive to electrical signals from generator 11 to propagate acoustic waves toward reflective surface 13 in a direction forming an acute angle $\theta$ with respect to normal incidence. The wave fronts (represented by the regularly spaced lines parallel to transducer 14) of the acoustic waves are thus inclined at acute angle $\theta$ with respect to surface 13. Accordingly, the sound waves strike the surface 13 at the angle $\theta$, thereby causing a displacement component to run upwards across the surface 13 with velocity $v'$ which is equal to $v_b/\sin\theta$ where $v_b$ is the bulk sound velocity inside the block. Sound wave reflections are eliminated or reduced to negligible amplitude by roughening the remaining surfaces of block 12 or lining them with sound absorbing material. Alternatively, the block may be so dimensioned that the reflected wave is sufficiently attenuated by inherent absorption in the material.

A cavity or slot 15 is machined into block 12 and filled with a liquid acoustic wave transmissive medium. The size and shape of cavity 15 are not critical, and if desired, the construction may consist simply of a relatively thin-walled tank filled with water or other suitable liquid; in any apparatus designed specifically for use with a particular type of object specimen, the cavity 15 is preferably formed to orient the specimen at the desired acute angle $\theta$ to the acoustic wave fronts. In a preferred embodiment, block 12 is made of a methyl methacrylate plastic and slot 15 is filled with water. If greater sensitivity is required, acoustic impedance matching may be provided by selection of materials and the interposition of impedance matching layers at the interfaces between the liquid and solid media. The object to be visualized is placed inside the cavity where it scatters the incident sound beam. Each plane wave in the angular spectrum of the scattered sound field causes its own characteristic ripple pattern on the front surface 13 of the block. If the composite ripple pattern were recorded optically by stroboscopic Schlieren techniques, it would constitute a hologram of the sound field recorded with a fictitious reference beam incident normal to the surface 13 of the block. The attainable contrast, however, is critically dependent on the optical quality of the surface and has been found to be generally not sufficiently high to permit direct photographic recording. In the illustrated system, most of the background noise due to optical imperfections is suppressed by electronic filtering which results in a very substantial increase in sensitivity and greatly improved image contrast.

Surface 13 of block 12 is scanned in a predetermined raster pattern with a focused beam of coherent light from a laser 16. For convenience, the scanning raster may be a standard television raster and scanning may be synchronized by conventional television sweep synchronizing circuits or systems 17. The laser scanning system 18 is of the acoustic Bragg diffraction type described, for example, in an article entitled "A Television Display Using Acoustic Deflection and Modulation of Coherent Light," by A. Korpel et al., APPLIED OPTICS, Vol. 5, No. 10, Oct. 1966, pages 1667—1675. The light reflected from surface 13 is partially intercepted by a knife edge 19, the unobstructed part of the reflected light being incident on a photodetector 20. A lens 21 images the exit pupil of the scanning system onto the knife edge, thus ensuring that all reflected beams are equally intercepted, regardless of the scanning angle. The incident laser beam is focused to a diffraction-limited spot size smaller than one-half wavelength of the acoustic surface perturbations caused by the incident sound waves. Under these conditions the reflected light is deflected periodically by a small amount as indicated by the broken lines. This periodic deflection is converted into intensity modulation by the knife edge, which in turn results in an electrical carrier signal from the photodetector. If the sampling light beam were stationary, the frequency of this signal would be equal to the sound frequency $f_s$. The scanning motion of the beam causes a doppler frequency shift $f_D$, the magnitude of which depends on the relative magnitude and direction of the surface ripple velocity and the scanning speed. Each plane wave in the angular spectrum of the scattered sound field causes its own characteristic ripple pattern and hence results in a characteristic doppler component. The output signal from photodetector 20 includes the composite doppler signal and, after amplification by an amplifier 21, is applied (when switches 22 and 23 are in their upper positions as shown) to a mixer 24 for heterodyning with the original sound frequency $f_s$ from signal generator 11 to produce a composite doppler signal $f_D$ which is applied to a TV monitor 25. Monitor 25 is connected to sweep synchronizing system 17 for synchronous operation with laser scanner 18. This results in a stationary display of the original composite ripple pattern which constitutes the acoustic hologram. A photograph taken of the TV screen constitutes a permanent holographic recording which may be reconstructed in a conventional way, i.e., by illumination with an appropriate reference beam. When switches 22 and 23 are operated to their lower contact positions, the output of amplifier 21 is applied to an amplitude detector 26 and a nonholographic or conventional picture of the sound field at surface 13 is produced on the image screen of monitor 25.

The knife edge detector is sensitive only to acoustic ripple patterns traveling in a direction transverse to the intercepting edge of element 19. If it is desired to make the system responsive to acoustic ripple pattern components in all directions, knife edge 19 may be replaced by an intercepting element having a circular aperture for detecting periodic variations in the focusing and defocusing of the reflected light beam. Also, the system may be employed to record holographic or conventional images by projecting the irradiating acoustic waves onto a liquid rather than a solid surface. As a further variant, the detected return beam signal may be heterodyned with a reference signal of a frequency other than the sound frequency $f_s$; by variously programming the phase of the reference signal with respect to the acoustic waves, acoustic holograms with various fictitious reference planes may be obtained.

A further discussion of the inventive system as well as experimental photographs of illustrative holograms and reconstructions are included in an article entitled "Rapid Sampling of Acoustic Holograms by Laser Scanning Techniques" by A. Korpel et al., to be published in an early issue of JOURNAL OF THE ACOUSTIC SOCIETY OF AMERICA.

Certain aspects of the disclosed system disclosed herein are also described and claimed in the copending application of Robert Adler and Adrianus Korpel, Ser. No. 763,682, filed concurrently herewith for OPTICAL DETECTING SYSTEMS and assigned to the present assignee.

Thus the invention provides a new and improved method and apparatus for recording acoustic holograms and a new and improved acoustic imaging device for use in such systems and in conventional acoustic image visualization and recording.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A method of recording an acoustic hologram of an object which comprises:
   irradiating said object with acoustic waves of a predetermined frequency to develop a field of acoustic vibrations in a predetermined surface plane;
   scanning said surface plane with a collimated light beam;
   measuring variations in a reflection component of light from said surface plane to develop an output signal having frequency variations which correspond with acoustic intensity variations in said surface plane;
   heterodyning said output signal with a reference signal having a frequency bearing a predetermined relationship to said predetermined acoustic-wave frequency to generate an image signal;
   and converting said image signal to a visual image display to generate an acoustic hologram of said object.

2. Apparatus for recording an acoustic hologram of an object comprising:
   an acoustic imaging system comprising a reflective surface and an electromechanical transducer for irradiating said surface with acoustic waves of a predetermined frequency and with acoustic wave fronts inclined with respect to said surface at a predetermined acute angle to develop a field of surface-wave perturbations on said surface;
   means including a flying spot laser scanner for scanning said surface with a collimated light beam;
   an optical detecting system responsive to variations in a reflection component of light from said surface for developing an output signal having frequency variations which correspond with intensity variations of said surface-wave perturbations;
   means for heterodyning said output signal with a reference signal of said predetermined acoustic-wave frequency to develop an image signal;
   and means converting said image signal to a visual image display to generate an acoustic hologram of said object.

3. Apparatus according to claim 2, in which said collimated light beam is focused to a diffraction-limited spot size at said surface smaller than one-half wavelength of the surface-wave perturbations caused by said acoustic waves.

4. Apparatus according to claim 2, in which said acoustic imaging system includes a receptacle in the path of said acoustic waves for receiving and orienting said object in a direction inclined at an acute angle with respect to the wave fronts of said acoustic waves.

5. An acoustic imaging device comprising:
   a solid block having a predetermined reflective surface and composed of a material having a predetermined acoustic impedance;
   means including an electromechanical transducer for projecting sound waves through said block to said surface at an acute angle with respect thereto to produce surface wave perturbations on said surface;
   and means for modifying said surface wave perturbations in accordance with a characteristic of an object to be examined comprising a slot in said block intercepting the path of said acoustic waves for receiving and orienting said object at an acute angle with respect to their wave fronts said slot being filled with a liquid acoustic wave transmissive medium.